United States Patent [19]

Nakajima et al.

[11] 4,363,852

[45] Dec. 14, 1982

[54] COATED PHOSPHATE GLASS

[75] Inventors: Yuji Nakajima, Tokyo; Tetsuro Izumitani, Hino, both of Japan

[73] Assignee: Hoya Corporation, Tokyo, Japan

[21] Appl. No.: 95,286

[22] Filed: Nov. 19, 1979

[30] Foreign Application Priority Data

Nov. 20, 1978 [JP] Japan .................................. 53-143163

[51] Int. Cl.³ ............................................ B32B 17/06
[52] U.S. Cl. ..................................... 428/432; 428/428; 428/696; 428/697; 428/701; 428/426; 428/702
[58] Field of Search ............... 428/432, 428, 696, 697, 428/701, 702, 426

[56] References Cited

U.S. PATENT DOCUMENTS

| 2,789,062 | 4/1967 | Cusano | 428/432 |
| 2,834,689 | 5/1958 | Jupnik | 428/432 |
| 2,858,240 | 10/1978 | Turner | 428/432 |
| 3,053,698 | 9/1962 | Ogle | 428/432 |
| 3,126,295 | 3/1964 | Young | 428/432 |
| 3,176,574 | 4/1965 | Socha | 428/432 |
| 3,738,732 | 6/1973 | Ikeda | 428/432 |
| 3,849,244 | 11/1974 | Groth | 428/432 |
| 3,883,214 | 3/1975 | Hoffman | 428/696 |
| 3,936,579 | 2/1976 | Ogasawara | 428/432 |

FOREIGN PATENT DOCUMENTS

| 2154030 | 5/1972 | Fed. Rep. of Germany | 428/696 |
| 49-29590 | 8/1974 | Japan | 428/432 |

Primary Examiner—Ellis P. Robinson
Attorney, Agent, or Firm—Sughrue, Mion, Zinn, Macpeak & Seas

[57] ABSTRACT

A phosphate glass having coated directly on the surface thereof a layer of a fluoride. The glass is particularly suitable as a laser glass.

6 Claims, No Drawings

COATED PHOSPHATE GLASS

BACKGROUND OF THE INVENTION

1. Field of the Invention

This invention relates to a phosphate glass and, specifically, to phosphate glassed coated with a film having strong resistance to water.

2. Description of the Prior Art

Heretofore, oxides have been preferentially used in contact with the glass surface in coating the glass surface. The preference for the oxide is due to its better adhesion to silicate and borate glasses than other materials. Sometimes, a fluoride has been used in contact with the surface of a silicate or borate glass, to obtain a refractive index required to prevent reflection.

Phosphate glasses are highly water soluble and, as a result, they are usually employed with a water resistant coating. When an oxide coating is used in contact with the glass surface which is the conventional practice, adhesion of the coating to the glass is weak. In particular, when the coated glass contacts water, the coating often peels from the surface, spots or stains are formed on the surface and the coating appears to be differently colored due to the light interference created by changes in the thickness of the coating. This is particularly troublesome with laser glasses where water tends to condense on the glass surface causing latent stains.

SUMMARY OF THE INVENTION

It has now been found that the aforesaid problems can be eliminated by a layer of a fluoride in contact with the surface of a phosphate glass.

DETAILED DESCRIPTION OF THE INVENTION

The teachings of the present invention are applicable to so-called phosphate glasses in general. An example of a typical phosphate glass composition is 53.7 wt% $P_2O_5$, 16.2 wt% $K_2O$, 21.1 wt% BaO, 3.5 wt% $Al_2O_3$, 5.5 wt% $TiO_2$ and 2.0 wt% $Nd_2O_3$. Of course, the present invention is not limited to this example.

Generally, the fluoride coating alone is sufficient to prevent stains, interference, etc. when a coated glass is only exposed to air having a high humidity. However, when water droplets adhere to the coated surface or the coated glass is dipped in water, the fluoride coating alone may not be resistant enough. For example, when a laser glass of a phosphate type is coated in accordance with this invention and allowed to stand in water for cooling, the coating is damaged. The damage to the coating is due not only to poor adhesion, but also to the ease with which the coating is dissolved in water. Accordingly, to obtain a coated glass having strong water resistance, the coating must be resistant to dissolution in water. Such a coated glass can be obtained by applying a coating of $MgF_2$, $SiO_2$, $ZrO_2$ or $TiO_2$ as an outermost layer. Thus, according to a second embodiment of this invention, there is provided a phosphate glass which comprises a layer of a fluoride in contact with the phosphate glass surface and a coating of any one or combination of $MgF_2$, $SiO_2$, $ZrO_2$ and $TiO_2$ as an outermost layer.

$MgF_2$ has been found to be the most suitable fluoride and can be used without the addition of an $SiO_2$, $ZrO_2$ or $TiO_2$ layer.

The glasses of the present invention are prepared by coating the glass with the fluoride and, optionally, oxide coating in sequence with the glass at a temperature of about 150° to 350° C. The preferred thickness of each coating is about 300 A to 1 μm.

EXAMPLES

A phosphate glass having the following composition in % by weight was coated with the materials shown in the following table.

| | |
|---|---|
| $P_2O_5$ | 72 |
| $Al_2O_3$ | 8 |
| MgO | 6 |
| $K_2O$ | 14 |

In all runs, the temperature of the glass at the time of coating was about 350° C., and the thickness of one coated layer was 1,000±50 A.

Each of the coated glass specimens was dipped in warm water at 70° C. for the time periods indicated in the table, and the state of the coating was observed. The results were evaluated on the following scale, and are shown in the table.

o: No change in the coating was observed.
P: The coating peeled from the glass.
R: Interfering fringe formed due to variations in the optical thickness of the coating, and the surface of the coating roughened.

| Coating Materials | | | | | | | | | | |
|---|---|---|---|---|---|---|---|---|---|---|
| Outer most layer | Layer in contact with glass surface | \multicolumn{9}{c}{Dipping time (hours) in warm water at 70° C.} |
| | | 5 | 24 | 48 | 72 | 96 | 136 | 226 | 352 | 452 |
| | $ThF_4$ | o | o | R | R | R | R | R | R | R |
| | $CeF_3$ | o | o | o | R | R | R | R | R | R |
| | $MgF_2$ | o | o | o | o | o | o | o | o | R |
| | $SiO_2$ | o | P | P | P | P | P | P | P | P |
| | $Al_2O_3$ | o | R | R | R | R | R | R | R | R |
| | $ZrO_2$ | o | o | o | o | o | o | o | P | P |
| | $TiO_2$ | o | o | o | o | o | o | o | P | P |
| | ZnS | o | o | o | o | R | R | R | R | R |
| $SiO_2$ | $MgF_2$ | o | o | o | o | o | o | o | o | o |
| $SiO_2$ | $ThF_4$ | o | o | o | o | o | o | o | o | R |
| $SiO_2$ | $CeF_3$ | o | o | o | o | o | o | o | o | R |
| $TiO_2$ | $MgF_2$ | o | o | o | o | o | o | o | o | o |
| $TiO_2$ | $ThF_4$ | o | o | o | o | o | o | o | o | R |
| $TiO_2$ | $CeF_3$ | o | o | o | o | o | o | o | o | R |
| $ZrO_2$ | $MgF_2$ | o | o | o | o | o | o | o | o | o |
| $ZrO_2$ | $CeF_3$ | o | o | o | o | o | o | o | o | R |
| $ZrO_2$ | $ThF_4$ | o | o | o | o | o | o | o | o | R |
| $Al_2O_3$ | $MgF_2$ | o | R | R | R | R | R | R | R | R |
| $Al_2O_3$ | $CeF_3$ | o | R | R | R | R | R | R | R | R |
| $Al_2O_3$ | $ThF_4$ | o | R | R | R | R | R | R | R | R |
| $CeF_3$ | $SiO_2$ | o | o | o | P | P | P | P | P | P |
| $CeF_3$ | $TiO_2$ | o | o | o | R | R | R | R | R | R |
| $ThF_4$ | $SiO_2$ | o | o | P | P | P | P | P | P | P |
| $ThF_4$ | $TiO_2$ | o | o | o | R | R | R | R | R | R |
| $MgF_2$ | $SiO_2$ | o | o | o | o | o | o | o | P | P |
| $MgF_2$ | $TiO_2$ | o | o | o | o | o | o | o | P | P |

The results obtained in the foregoing Examples demonstrate the following.

A glass specimen coated with a single $MgF_2$ layer showed the best result among those coated with a single layer. With other fluorides such as $ThF_4$ and $CeF_3$, the resistance of the coating to water was improved if a water-impermeable coating of $MgF_2$, $SiO_2$, $TiO_2$ or $ZrO_2$ is applied as an outermost layer. The best result was obtained when $MgF_2$ was used as a layer in contact with the glass surface. When an oxide such as $SiO_2$ or $TiO_2$ is used as a layer in contact with the glass surface, the resistance of the coating to water was scarcely improved.

While the invention has been described in detail and with reference to specific embodiments thereof, it will be apparent to one skilled in the art that various changes and modifications can be made therein without departing from the spirit and scope thereof.

What we claim is:

1. A water-soluble phosphate glass having coated directly on the surface thereof a layer of a fluoride selected from the group consisting of $ThF_4$ or $CeF_3$.

2. The water-soluble phosphate glass of claim 1, wherein a coating of one or more members selected from the group consisting of $MgF_2$, $SiO_2$, $ZrO_2$ and $TiO_2$ is formed on the fluoride layer as a water-resistant outermost layer.

3. A water-soluble phosphate glass having coated directly on the surface thereof a layer of $MgF_2$ and wherein said $MgF_2$ layer is coated with a layer of one or more members selected from the group consisting of $SiO_2$, $ZrO_2$ and $TiO_2$.

4. A laser glass comprising a water-soluble phosphate glass having coated directly on the surface thereof a layer of a fluoride selected from the group consisting of $ThF_4$ and $CeF_3$.

5. The laser glass of claim 4, wherein a coating of one or more members selected from the group consisting of $MgF_2$, $SiO_2$, $ZrO_2$ and $TiO_2$ is formed on the fluoride layer as a water-resistant outermost layer.

6. A laser glass comprising a water-soluble phosphate glass having coated directly on the surface thereof a layer of $MgF_2$ and wherein said $MgF_2$ layer is coated with a layer of one or more members selected from the group consisting of $SiO_2$, $ZrO_2$ and $TiO_2$.

* * * * *